(12) United States Patent
Fujikawa

(10) Patent No.: US 7,082,002 B2
(45) Date of Patent: Jul. 25, 2006

(54) OBJECTIVE LENS DRIVING APPARATUS AND MANUFACTURING METHOD THEREOF

(75) Inventor: Yasuo Fujikawa, Tokushima (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 11/013,674

(22) Filed: Dec. 15, 2004

(65) Prior Publication Data

US 2005/0099702 A1    May 12, 2005

Related U.S. Application Data

(62) Division of application No. 10/049,179, filed on Feb. 8, 2002, now Pat. No. 6,857,126.

(51) Int. Cl.
*G02B 7/02*    (2006.01)

(52) U.S. Cl. ............... 359/813; 359/814; 359/819; 369/44.14; 369/44.15

(58) Field of Classification Search ............... 359/813, 359/811, 819, 618, 814, 824; 369/44.11, 369/44.14, 44.15, 44.16, 44.22
See application file for complete search history.

(56) References Cited

U.S. PATENT DOCUMENTS

2002/0041563 A1*    4/2002    Shinozuka et al. ......... 369/244

* cited by examiner

*Primary Examiner*—Ricky Mack
*Assistant Examiner*—Brandi Thomas
(74) *Attorney, Agent, or Firm*—Sheridan Ross P.C.

(57) ABSTRACT

The invention provides an inexpensive and easily manufactured objective lens driving apparatus having a reinforcing rib for reinforcing a coil restraining part of a support printed board formed on a lens holder. The ends of a focusing coil and a tracking coil are wound around the support printed board and the reinforcing rib part in a bundle.

7 Claims, 14 Drawing Sheets

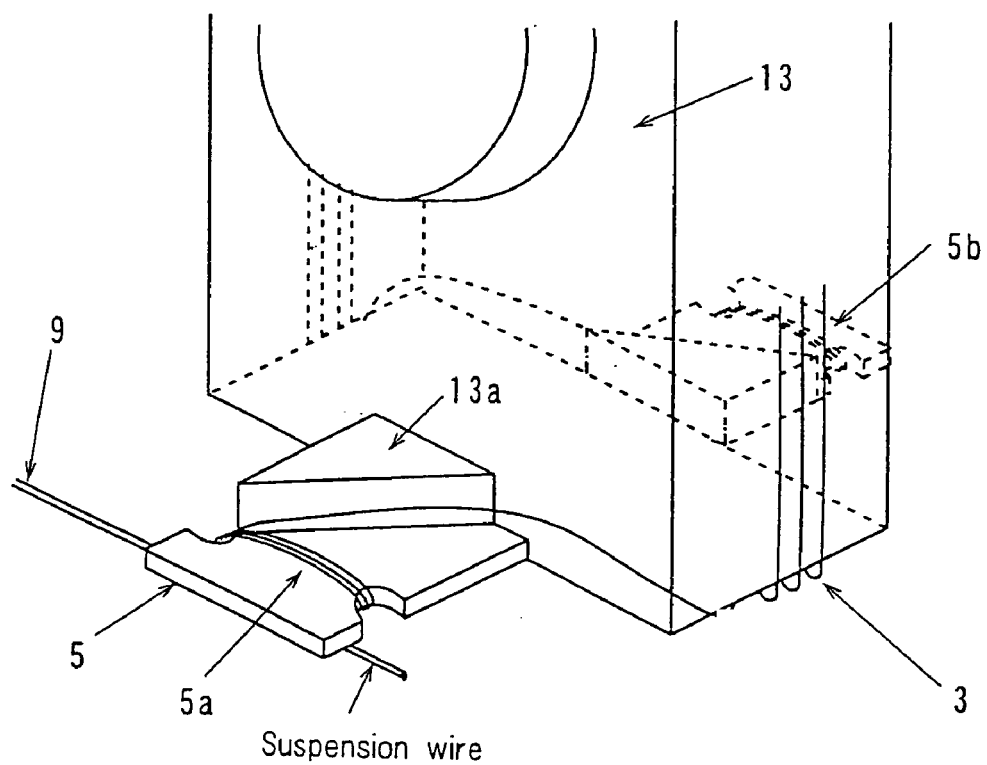
F I G. 2

Tracking direction

Focusing direction

A-A sectional view

OBJECTIVE LENS DRIVING APPARATUS AND MANUFACTURING METHOD THEREOF

CROSS REFERENCE TO RELATED APPLICATIONS

This application is a divisional application of U.S. patent application Ser. No. 10/049,179, filed Feb. 8, 2002, now U.S. Pat. No. 6,857,126, which is incorporated in its entirety by this reference.

TECHNICAL FIELD

This invention relates to an objective lens driving apparatus for driving an objective lens in response to an applied control signal and performing focusing and tracking with respect to an optical data recording medium and its manufacturing method.

BACKGROUND ART

Currently, optical disk devices (e.g. DVD disk apparatus) that mount an optical pickup (including an objective lens) for recording a signal onto, or reproducing a signal from, an optical data record medium (e. g. optical disk such as DVD disk) are in increasing demand.

These optical disk devices have an objective lens driving apparatus for driving an objective lens in response to a control signal and performing focusing control and tracking control.

This invention relates to an objective lens driving apparatus, and particularly to the configuration of a support printed board and its periphery for restraining the winding of a focusing coil or a tracking coil of the objective lens driving apparatus.

Japanese Laid-open Public Patent Application Hei 5-342607 describes a conventional objective lens driving apparatus having a support printed board for restraining winding of a focusing coil or a tracking coil.

The configuration will be explained hereinafter.

FIG. 14(a) shows a front view of the conventional objective lens driving apparatus described in the Official Gazette of Japanese Laid-open Public Patent Application Hei 5-342607.

FIG. 14(b) shows a bottom view of the conventional objective lens driving apparatus described in the Official Gazette of Japanese Laid-open Public Patent Application Hei 5-342607.

FIG. 14(c) shows a left side view of the conventional objective lens driving apparatus described in the Official Gazette of Japanese Laid-open Public Patent Application Hei 5-342607.

In FIG. 14, 1 is an objective lens and 2 is a lens holder to which the objective lens 1 is attached. A focusing coil 3 for driving the objective lens 1 in the focusing direction (a direction of the arrow shown in FIG. 14, that is, the same direction as that of the optical axis of the objective lens 1) and a tracking coil 4 for driving the objective lens 1 in the tracking direction (a direction of the arrow shown in FIG. 14) are wound around the lens holder 2.

Two support printed boards 5 are fixed at two positions indicated by the tip of the arrow pointing to lens holder 2.

The starting ends and the terminating ends of the focusing coil 3 and the tracking coil 4 are restrained by winding a few turns along coil restraining parts, which are located in the vicinity of the front end parts of the support printed boards 5 which protrude from the top surface and the bottom surface of the lens holder 2.

A fixed member 6 is composed of a printed board and referred to as an act printed board. As shown in the left side view, the act printed board 6 has four patterns, each pattern having a land part and a through hole formed in the center or the periphery of the land part at one end. A support block 7 has a recessed part injected with damper material 8 therein and four through holes formed in the recessed part. The act printed board 6 and the support block 7 are fixed so that four through holes of the act printed board 6 and four through holes of the support block 7, respectively, are placed coaxially.

Each end of four suspension wires 9 made of conductive metal wire are fixed to the act printed board 6 by soldering through the through hole of the act printed board 6 and the through hole of the support block 7 at one end, and fixed to the coil restraining part of the support printed board 5 by soldering at the other end.

With the above-mentioned configuration, it is possible to obtain a conductive path which starts from one of the patterns of the act printed board 6, through 2 suspension wires 9 connected thereto, a land part of the support printed board 5 connected to the suspension wire 9, the focusing coil 3 connected to the land part of the support printed board 5, other land part of the support printed board 5 connected to the other end of the focusing coil 3, other suspension wire 9 connected to the other land part of the support printed board 5, and returns to the other patterns of the act printed board 6 connected to the other suspension wire 9.

By feeding current of a focusing control signal through this path, focusing control of the objective lens 1 is achieved.

Similar to the focusing control signal, by feeding current of a tracking control signal through the conductive path containing the other two patterns of the act printed board 6, the other two suspension wires 9, the other two land parts of the support printed board 5, and the tracking coil 4, tracking control of the objective lens 1 is achieved.

Furthermore, the support block 7 is fixed to a yoke 10 at the position as shown in the figure.

The lens holder 2 is supported by four suspension wires 9 so as to be located at the center between permanent magnets 11 and 12.

A magnetic circuit consisting of the permanent magnets 11 and 12, and the yoke 10 provided as an adjunct with the permanent magnets 11 and 12 generates a substantially uniform magnetic field in the vicinity of the focusing coil 3 and the tracking coil 4.

By feeding a focusing control signal to the focusing coil 3 within the uniform magnetic field, Lorentz force is generated, thereby producing a torque for driving the lens holder 2 in the focusing direction.

Likewise, by feeding a tracking control signal to the tracking coil 4 within the uniform magnetic field, Lorentz force is generated, thereby producing a torque for driving the lens holder 2 in the tracking direction.

As four suspension wires 9 are made of flexible metal wire, the lens holder 2 undergoes displacement due to the above-mentioned torque actuation.

Moreover, in the instance in which the focusing coil 3 and the tracking coil 4 are wound by an automatic winder, parts of the support printed board 5 are configured to protrude from the lens holder 2 and the parts neighboring the front ends of the protruding support printed board act as coil restraining parts, thereby facilitating restraint of the starting ends and the terminating ends of windings.

The objective lens driving apparatus is required to improve tracking sensitivity for high-speed playback. As a solution, it is effective to reduce the weight of the movable body. Specific measures are thinning of the lens holder and weight reduction in the support printed board.

However, weight reduction causes rigidity degradation of the movable body, resulting in the deterioration of the high-order resonance characteristic of the objective lens driving apparatus. Although thinning of the lens holder and weight reduction in the support printed board are effective in improving tracking sensitivity, these members become less integrated. As a result, the coil restraining part of the support printed board which protrudes from the lens holder has a separate vibration mode at high frequencies.

For that reason, with respect to the vibration characteristic of the objective lens driving apparatus, undesired resonance and disturbance in phase occurs, and tracking performance of the objective lens driving apparatus for the optical data recording medium deteriorates. Further, there is the possibility of consuming unnecessary electricity for tracking.

On the other hand, in order to facilitate the arrangement of the starting ends and the terminating ends of the coils wound by an automatic winder, it is desirable to configure the coil restraining part of the support printed board to protrude from the lens holder as mentioned above.

An object of the present invention is to provide an inexpensive and easily manufacturable objective lens driving apparatus which is excellent in tracking sensitivity and free from the undesired resonance mode.

Another object of the present invention is to provide an inexpensive manufacturing method for manufacturing an objective lens driving apparatus which is excellent in tracking sensitivity and free from the undesired resonance mode without adding new processes.

DISCLOSURE OF INVENTION

A first invention is an objective lens driving apparatus having an objective lens, a lens holder for holding the objective lens, a focusing coil with a central axis substantially parallel to the focusing direction of the objective lens, a tracking coil with a central axis substantially parallel to the tracking direction of the objective lens, a magnet for generating a magnetic field in the vicinity of the focusing coil and tracking coil, a support printed board having coil restraining parts which protrude from side surfaces of the lens holder and restrain ends of at least either the focusing coil or tracking coil, and a plurality of suspension wires made of conductive material, wherein the lens holder has a reinforcing rib which contacts at least a part of the portion of the support printed board protruding from the lens holder.

The lens holder of the objective lens driving apparatus according to this invention has a reinforcing rib for supporting the coil restraining part of the support printed board.

This can prevent the coil restraining part of the support printed board from causing undesired resonance and unnecessary disturbance in phase.

This invention provides an inexpensive objective lens driving apparatus with high tracking sensitivity.

A second invention is the objective lens driving apparatus according to the first invention in which the surface of the reinforcing rib that does not contact the side surface of the lens holder forms an inclined plane with respect to the side surface of the lens holder, and winding of the coil restrained at the coil restraining part is located along the inclined plane.

In the instance that the whole back surface of the support printed board is supported by the reinforcing rib, the winding of the coil around the coil restraining part can interfere physically with (contact with) the position of inserting the suspension wire.

In the objective lens driving apparatus according to this invention, the surface of the reinforcing rib that does not contact the side surface of the lens holder forms an inclined plane with respect to the side surface of the lens holder (not parallel to the side surface of the lens holder).

Winding of coil is disposed along the inclined plane, thereby preventing the winding of coil from interfering with the insertion position of the suspension wire.

According to this invention, the coil restraining part of the support printed board does not cause undesired resonance and unnecessary disturbance in phase, and at the same time, it is possible to achieve stable winding of coil and stable insertion of the suspension wire during assembly of the objective lens driving apparatus so that the quality of product in a factory can be improved.

This invention has the effect of realizing the inexpensive and easily manufacturable objective lens driving apparatus with high tracking performance.

Further, this invention provides the objective lens driving apparatus in which the starting end and the terminating end of the coil wound by an automated winder are easily restrained.

A third invention is an objective lens driving apparatus of the first invention in which winding of the coil is restrained at the restraining part by winding one turn or a few turns around the support printed board and the reinforcing rib.

According to this invention, the support printed board and the reinforcing rib can become integrated without adhesive so that the coil restraining part of the support printed board does not cause an undesired resonance and unnecessary disturbance in phase.

This invention has the effect of realizing the inexpensive objective lens driving apparatus with high tracking performance.

A fourth invention is an objective lens driving apparatus of the first invention, or the third invention in which the reinforcing rib part has a stepped portion or a grooved portion and winding of the coil which is restrained at the restraining part is located along the stepped portion or the grooved portion.

This invention can prevent winding of the coil from interfering with the insert position of the suspension wire. Also, according to this invention, the coil restraining part of the support printed board does not cause undesired resonance and unnecessary disturbance in phase, and at the same time, it is possible to achieve stable winding of the coil and stable insertion of the suspension wire during assembly of the objective lens driving apparatus so that quality of product in a factory can be improved.

This invention has the effect of realizing the inexpensive and easily manufacturable objective lens driving apparatus with high tracking performance.

Further, this invention has the effect of realizing the objective lens driving apparatus in which the starting end and the terminating end of the coil wound by an automated winder are easily restrained.

A fifth invention is an objective lens driving apparatus of any of the first to the third inventions in which the support printed board has a plurality of notches and the winding of the coil, which is restrained at the restraining parts, is located along the notches.

This invention provides the objective lens driving apparatus in which the starting end and the terminating end of the coil wound by an automated winder are easily restrained.

A sixth invention is an objective lens driving apparatus having an objective lens, a lens holder for holding the objective lens, a focusing coil having a central axis substantially parallel to a focusing direction of the objective lens, a tracking coil having a central axis substantially parallel to a tracking direction of the objective lens, a magnet for generating a magnetic field in the vicinity of the focusing coil and the tracking coil, a support printed board which protrudes from side surfaces of the lens holder and has a restraining part for restraining the winding of at least the focusing coil or the tracking coil, a plurality of suspension wires made of conductive material, and an adhesive which is applied to a corner part defined by a protrusion from the support printed board from the lens holder and a side surface of the lens holder.

According to this invention, the coil restraining part of the support printed board does not cause undesired resonance and unnecessary disturbance in phase.

This invention produces the inexpensive and easily manufacturable objective lens driving apparatus with high tracking performance.

A seventh invention is an objective lens driving apparatus of the sixth invention in which the lens holder has a bonded part with the support printed board, the bonded part comprising a first depression as an adhesive reservoir and a groove which extends from the first depression to a base of the support printed board.

According to this invention, the coil restraining part of the support printed board does not cause undesired resonance and unnecessary disturbance in phase.

Further, the support printed board can be firmly fixed by pushing the support printed board against the first depression, as well as applying adhesive to the corner part by extending adhesive along the groove of the lens holder which extends from the first depression to the corner part. This can be achieved during a single process. Therefore, the adhesive can be applied to the corner part without adding any new process. This invention provides an inexpensive and easily manufactured objective lens driving apparatus with high tracking performance.

A eighth invention is an objective lens driving apparatus of the sixth invention in which the lens holder has a second depression that acts as an adhesive reservoir for bonding the objective lens, and a groove which extends from the second depression to a base of the support printed board.

According to this invention, the coil restraining part of the support printed board does not cause undesired resonance and unnecessary disturbance in phase.

Further, by pushing a member against the second depression, the member and the objective lens are fixed firmly, and by extending adhesive along the groove of the lens holder which extends from the first depression to the corner, the adhesive will contact the corner part. Therefore, the adhesive can be applied to the corner part without adding any new process.

This invention provides an inexpensive and easily manufacturable objective lens driving apparatus with high tracking performance.

A ninth invention is a manufacturing method for the objective lens driving apparatus of the sixth invention including the steps of dropping an adhesive into the first depression formed on the lens holder, and fixing firmly the support printed board by pushing the support printed board against the first depression, as well as applying adhesive to the corner part by extending the adhesive along the groove of the lens holder which extends from the first depression to the corner part.

According to this invention, the adhesive can be applied to the corner part without adding any new process. As a result, the coil restraining part of the support printed board does not cause undesired resonance and unnecessary disturbance in phase.

This invention provides an inexpensive method of manufacturing the objective lens driving apparatus with high tracking performance.

A tenth invention is a manufacturing method of the objective lens driving apparatus of the sixth invention including the steps of dropping an adhesive into the second depression formed on the lens holder, and fixing firmly the objective lens by pushing a member against the second depression, as well as applying adhesive to the corner part by extending adhesive along the groove of the lens holder which extends from the second depression to the corner part.

According to this invention, the adhesive can be applied to the corner part without adding any new process. As a result, the coil restraining part of the support printed board does not cause undesired resonance and unnecessary disturbance in phase.

This invention provides an inexpensive method for manufacturing the objective lens driving apparatus with high tracking performance.

"Member" means an optional member. Typically, it is a lens protector (FIG. 13(b) and FIG. 13(c)).

The novel features of the invention will be hereinafter fully described and particularly pointed out in the appended claims, and the configuration and details of the invention, together with other objects and features thereof, will become better understood and appreciated by reference to the following detailed description when considered in conjunction with the accompanying drawings.

BRIEF DESCRIPTION OF THE DRAWINGS

FIG. 2 is a perspective view in schematic form depicting the configuration of the reinforcing rib of the objective lens driving apparatus of embodiment 1.

10(b) is a bottom view of FIG. 10(a). FIG. 10(c) is a sectional view taken along the B—B line of FIG. 10(a).

FIG. 13(a) is a perspective view in schematic form depicting the configuration of the reinforcing rib of the objective lens driving apparatus of embodiment 6. FIG. 13(b) and FIG. 13 (c) depict a manufacturing method for manufacturing the objective lens driving apparatus of embodiment 6.

It is noted that a part or whole of the figures are schematically depicted for diagrammatic representation and they do not necessarily reflect actual relative size and position of components shown therein.

BEST MODE FOR EMBODYING THE INVENTION

Embodiments which make a concrete explanation of best mode for embodying the present invention will be described hereinafter with the appended figures. However, the present invention is not limited to the following embodiments.

EMBODIMENT 1

Figure 1:
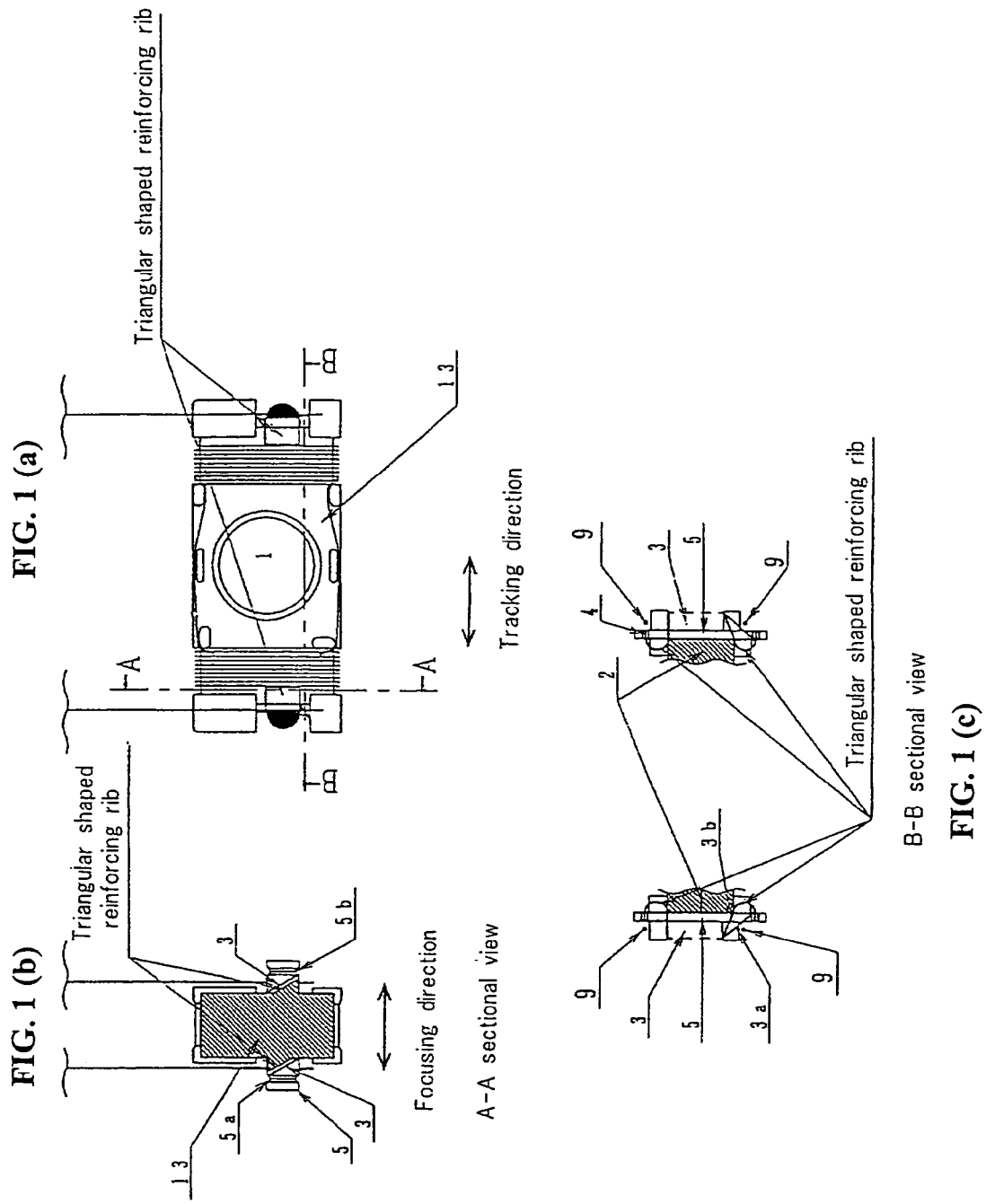
FIG. 1(a) is a front view of the objective lens driving apparatus of embodiment 1.
FIG. 1(b) is a sectional view taken along the A—A line of FIG. 1(a).
FIG. 1(c) is a sectional view taken along the B—B line of a FIG. 1(a).
Figure 3:
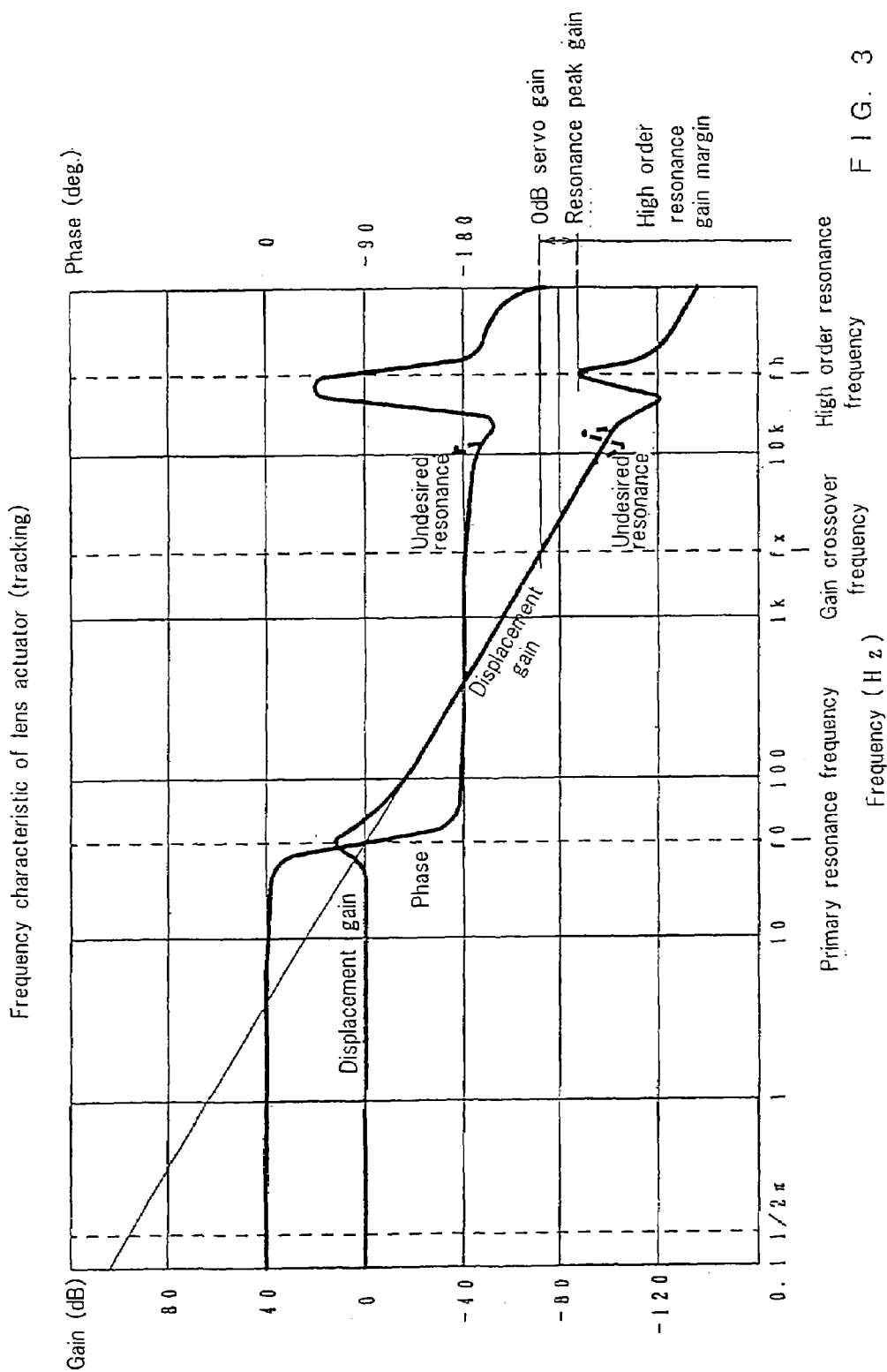
FIG. 3 is a graph showing frequency characteristic of the objective lens driving apparatus of embodiment 1.

Referring to FIG. 1 to FIG. 3, an objective lens driving apparatus of embodiment 1 according to the present invention will be explained.

First, the vibration characteristic of the objective lens driving apparatus will be explained.

FIG. 3 shows the frequency characteristic of displacement gain in the tracking direction with respect to the objective lens driving apparatus. The peak frequency having the highest displacement gain in the whole frequency range is referred to as primary resonance and the peak frequency in higher frequency range is referred to as high order resonance.

And, undesired resonance appearing in proximity to 10 kHz in the drawing is caused by self-resonance of a support printed board.

On the basis of gain crossover frequency fx shown in the drawing, low-frequency side indicates servo frequency range of the objective lens driving apparatus (i.e. the frequency range in which vibration, error and so on can be suppressed by controlling the objective lens driving apparatus), and high-frequency side indicates non-servo frequency range (i.e. high-frequency range in which the objective lens driving apparatus gives no response).

In the presence of undesired resonance in the non-servo frequency range, when coil current exceeding minimum track displacement is applied, tracking cannot be carried out with tracking accuracy in the objective lens driving apparatus, potentially resulting in an off-track state.

However, as servo operation is not performed in this frequency range, the displacement is kept uncontrolled and off-track state cannot be resolved.

In equipment using objective lens driving apparatus (e.g., a DVD device), a phase compensating filter ensures phase margin of 35° to 60° known as stable for servo control in gain crossover frequency range. At that time, the presence of phase disturbance due to undesired resonance can interfere with the provision of the phase margin.

Therefore, undesired resonance in non-servo frequency range deteriorates tracking performance of tracking control in the optical disk apparatus. Further, it causes unnecessary electricity consumption.

As described above, in order to achieve an optical disk apparatus with high tracking performance, it is highly important to suppress self-resonance of a support printed board.

For this purpose, in the objective lens driving apparatus of embodiment 1, a lens holder 13 has four reinforcing ribs 13a so as to suppress self-resonance of the support printed board.

The remaining structure of the apparatus is the same as the corresponding structure of the above-mentioned conventional objective lens driving apparatus.

FIG. 1(a) shows a front view, FIG. (B) shows a sectional view taken along the A—A line and FIG. 1(c) shows a sectional view taken along the B—B line of a movable section of the objective lens driving apparatus of embodiment 1 according to the present invention. FIG. 2 shows a perspective view in schematic form depicting the configuration of the reinforcing rib 13a of the objective lens driving apparatus of embodiment 1. The reinforcing rib 13a is represented larger than life.

The movable section means movable parts held by a suspension wires 9 in the objective lens driving apparatus, including an objective lens 1, the lens holder 13, a focusing coil 3, a tracking coil 4, support printed boards 5, and the suspension wires 9.

As parts other than the movable parts are the same as the corresponding parts of the above-mentioned conventional objective lens driving apparatus, description is omitted. In the objective lens driving apparatus of embodiment 1, parts except for the four reinforcing ribs 13a of the lens holder and placement of coils (the focusing coil 3 and the tracking coil 4) are the same as the corresponding parts of the conventional objective lens driving apparatus, these parts are identified by the same reference numbers. Description thereof is omitted.

As shown in FIG. 1(b) and FIG. 2, the reinforcing rib 13a of the lens holder 13 contacts the support printed board 5 protruding from the side surfaces of the lens holder (front surface and back surface) (both ends of each of two support printed boards protrude from the side surfaces of the lens holder, respectively (at four locations in total)), thereby reinforcing the base of the support printed board 5. Preferably, the contact surfaces of the support printed board 5 and the reinforcing rib 13a are fixed to each other by adhesive.

A surface of the reinforcing rib that does not contact the side surface of the lens holder forms an inclined plane with respect to the side surface of the lens holder. The reinforcing rib 13a of embodiment 1 is shaped like a triangle pole with a right triangular cross section, and the contact surface with the printed board is shaped like a right triangle.

Regarding the base side (the same surface as the side of the lens holder) as a bottom line of the triangle (one of the lines making a right angle), an apex of the triangle (the furthermost position from the side of the lens holder) is located in the vicinity of a coil restraining part of the support printed board (located near the front end of the support printed board).

Cross section of the reinforcing rib may be shaped like a trapezoid in place of a triangle. A trapezoidal surface of the reinforcing rib that does not contact the side surface of the lens holder forms an inclined plane with respect to the side surface of the lens holder.

At four coil restraining parts, the starting ends and the terminating ends of windings of the focusing coil 3 and the tracking coil 4 are fixed, respectively.

Referring to FIG. 1(b) (a sectional view viewed from right side along the A—A line of the front view of FIG. 1(a)) and FIG. 2, a method of arranging the coils will be explained hereinafter.

The focusing coil 3 is wound a few turns around the coil restraining part 5a located in the vicinity of the front end of the support printed board for restraining and then winds along the inclined plane of the reinforcing rib 13a in the shape of a right triangle as a guideline.

The wire located along the inclined plane is led to a focusing coil winding part of the lens holder 13 having reinforcing ribs and the wire is wound on it to form the focusing coil 3.

Upon completion of the winding up, the wire is located along the inclined plane of the reinforcing rib 13a at the side of a coil restraining part 5b which acts as a guideline.

The wire located along the inclined plane is led to the coil restraining part 5b located in the vicinity of the front end of the support printed board and is wound a few turns along the coil restraining part 5b for restraining.

Similarly, the tracking coil 4 is also located along the inclined planes of the other two reinforcing ribs as guidelines and wound on a tracking coil winding part of the lens holder 13 having the reinforcing ribs.

Referring to FIG. 1(c), a cross sectional view taken along the B—B line of FIG. 1(a), wiring paths 3a and 3b of the focusing coil 3 between the coil restraining part 5a of the support printed board 5 and the focusing coil winding part of the lens holder 13 having the reinforcing ribs will be described.

In the conventional objective lens driving apparatus, owing to the absence of reinforcing ribs (as there is no guideline for coil), when the wire is wound by an automated winder, the shortest path 3a of wiring is likely to be selected.

However, this raises a possibility that the shortest path 3a contacts the suspension wire 9 (the shortest path 3a interferes with the suspension wire 9). Assembly of the objective lens driving apparatus includes inserting the suspension wire 9 following the above-mentioned winding process. Therefore, when the suspension wire contacts the focusing coil, there is the possibility of a failure to insert the wire.

Alternatively, in the objective lens driving apparatus of embodiment 1, the wiring path of the focusing coil 3 is guided by the reinforcing ribs so as to be fixed at the path 3b.

On the wiring path 3b, the wire does not contact the suspension wire 9. Accordingly, the above-mentioned problem does not occur during assembly, thereby facilitating assembly of the objective lens driving apparatus and improving the quality of the product in the factory.

By using the lens holder with reinforcing ribs in the shape of a right triangle as described for the this embodiment, undesired resonance of 6 dB (12 kHz) disappears and the high order resonance margin (which is the difference between displacement gain of 1 kHz and peak of high order resonance) is improved from 40 dB to 45 dB.

This promotes the tracking performance of the objective lens driving apparatus for the optical data recording medium.

Further, it enables a stable arrangement of the starting ends and the terminating ends of coils by automated winder (arrangement fork restraining the starting end and the terminating end of winding of the coil at the support printed board), as well as insertion of the suspension wire.

EMBODIMENT 2

Figure 4:
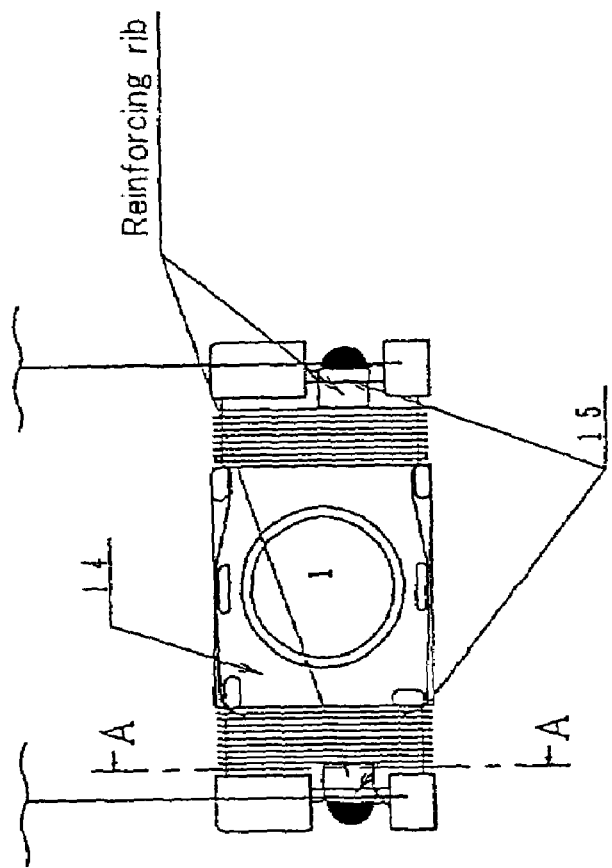
FIG. 4(a) is a front view of a movable section of the objective lens driving apparatus of embodiment 2.
FIG. 4(b) is a sectional view taken along the A—A line of FIG. 4(a).
Figure 4:
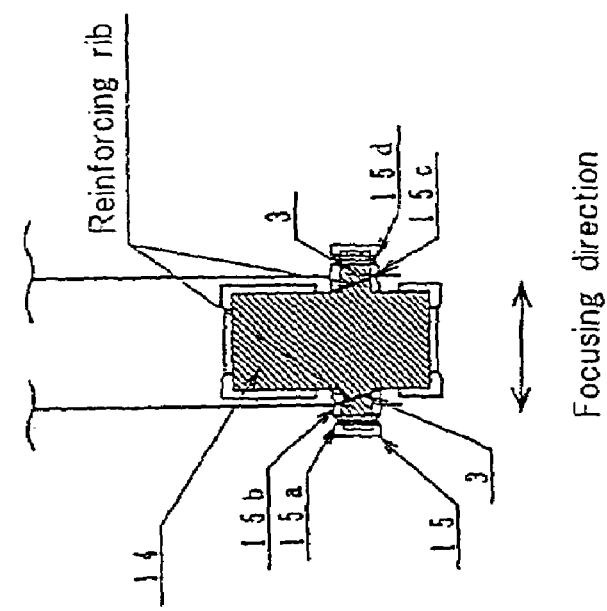
Figure 5:
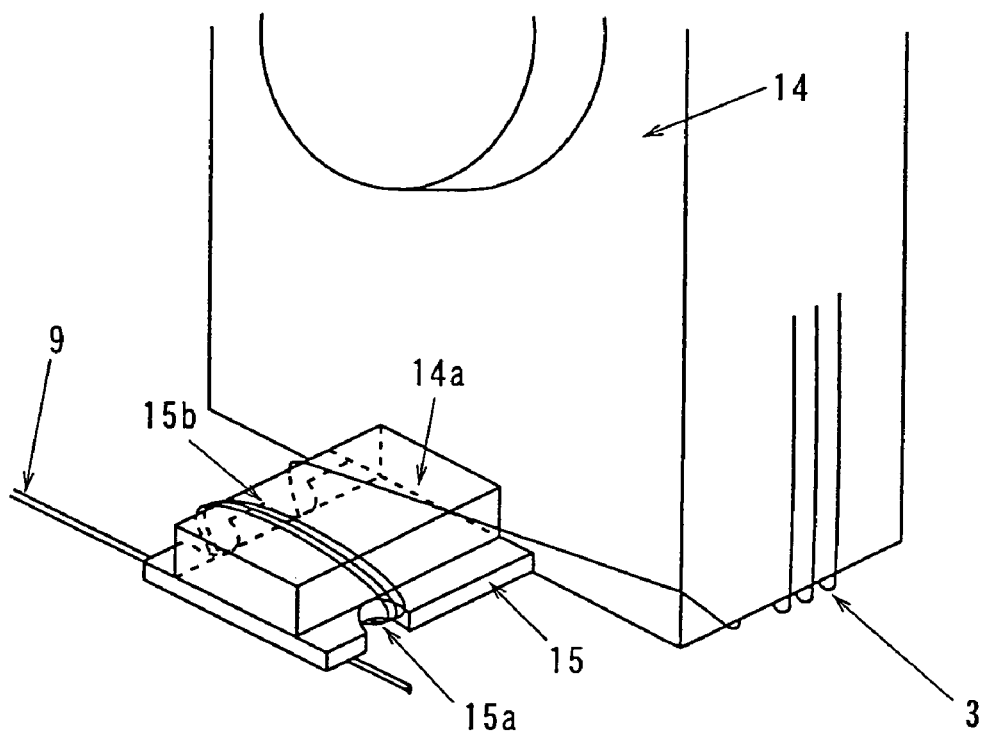
FIG. 5 is a perspective view in schematic form depicting the configuration of the reinforcing rib of the objective lens driving apparatus of embodiment 2.

Referring to FIG. 4 and FIG. 5, an objective lens driving apparatus of embodiment 2 according to the present invention will be explained.

In order to suppress self-resonance of a support printed board, the objective lens driving apparatus of embodiment 2 comprises a lens holder 14 having four reinforcing ribs and a support printed board 15 with a plurality of notches. The reinforcing rib 14a is different from that of embodiment 1 in shape.

The remaining structure of the apparatus is the same as the corresponding structure of the above-mentioned conventional objective lens driving apparatus.

FIG. 4(a) shows a front view, and FIG. 4(b) shows a sectional view, taken along the A—A line of a movable section of the objective lens driving apparatus of embodiment 2. FIG. 5 shows a perspective view in schematic form depicting the configuration of the reinforcing rib 14a of the objective lens driving apparatus of embodiment 2. The reinforcing rib is represented larger than life.

The movable section means movable parts held by suspension wires 9 in the objective lens driving apparatus, including the objective lens 1, the lens holder 14, the focusing coil 3, the tracking coil 4, the support printed boards 15, and the suspension wires 9.

As parts other than the movable parts are the same as the corresponding parts of the above-mentioned conventional objective lens driving apparatus, description is omitted.

In the objective lens driving apparatus of embodiment 2, parts except for four reinforcing ribs 14a of the lens holder, plural notches of the support printed board 15 and placement of coils (the focusing coil 3 and the tracking coil 4) are the same as the corresponding parts of the conventional objective lens driving apparatus, these parts are identified by the same reference numbers. Description thereof is omitted.

As shown in FIG. 5, the reinforcing rib 14a of the lens holder 14 with reinforcing ribs contacts the support printed board 15 protruding from the side surfaces of the lens holder (front surface and back surface) (both ends of each of two support printed boards protrude from the side surfaces of the lens holder, respectively (at four locations in total)), thereby reinforcing the base of the support printed board 15.

At four coil restraining parts, the starting ends and the terminating ends of windings of the focusing coil 3 and the tracking coil are fixed.

In embodiment 2, the contact surfaces of the support printed board 15 and the reinforcing rib 14a maybe fixed to each other by adhesive or may not be fixed.

At the coil restraining part, wire is wound a few turns around the reinforcing rib 14a and the support printed board 15 with notches so as to tie the reinforcing rib 14a and the support printed board 15 with notches in a bundle. In this way, the reinforcing rib 14a and the support printed board 15 with notches are firmly fixed to each other by the wound coil.

With this configuration, resonance of the support printed board with notches 15 can be suppressed by the reinforcing rib 14a.

The reinforcing rib 14a is formed so as to have the same height as the support printed board 15 and the same width as, or narrower width than, the notched portion of the support printed board 15. The support printed board 15 with notches comprises a plurality of notches 15b and 15c (the notch may be single) in addition to the coil restraining parts 15a and 15d.

Referring to FIG. 4(b) (a sectional view viewed from the right side along the A—A line of the front view of FIG. 4(a)) and FIG. 5, a method of arranging the coils will be explained hereinafter.

At the coil restraining port 15a in the vicinity of the front end of the support printed board, wire of the focusing coil 3 is wound a few turns around the reinforcing rib 14a and the support printed board 15 with notches so as to tie the reinforcing rib 14a and the support printed board 15 with notches in a bundle for restraining. The wire is then led to the focusing coil winding part of the lens holder 14 having reinforcing ribs through the notch 15b of the support printed board with notches (being guided by the notch 15b). The wire is wound on the focusing coil winding part to form the focusing coil 3.

On the completion of winding, the wire is led to the coil restraining part 15d through the notch 15c of the support printed board with notches (being guided by the notch 15c).

At the coil restraining part 15d, winding of the focusing coil 3 is wound a few turns around the reinforcing rib and the support printed board 15 with notches so as to tie the reinforcing rib and the support printed board 15 with notches in a bundle for restraining.

Similarly, wire of the tracking coil 4 is also wound a few turns around the reinforcing rib and the support printed board 15 with notches for restraining, and after that, the restrained wire is led to the tracking coil winding part of the lens holder 14 with reinforcing ribs using the notches 15b and 15c of the support printed board with notches as guides. The wire is wound on the tracking coil winding part.

In the objective lens driving apparatus of embodiment 2, a wiring path of the focusing coil 3 is guided by the notches 15b and 15c of the support printed board with notches so as to be fixed at the path 3b (as shown in the sectional view taken along the B—B line of FIG. 1).

On the wiring path 3b, the winding does not contact the suspension wire 9. Accordingly, no problem occurs during the assembly process, thereby facilitating assembly of the objective lens driving apparatus and improving the quality of product in the factory.

According to this embodiment, undesired resonance of 6 dB (12 kHz) disappears and high order resonance margin (which is the difference between displacement gain of 1 kHz and the peak of high order resonance) is improved from 40 dB to 45 dB. This promotes tracking performance of the objective lens driving apparatus for the optical data recording medium. Further, it enables a stable arrangement of the starting ends and the terminating ends of the coils by an automated winder, as well as insertion of the suspension wire.

EMBODIMENT 3

Figure 6:
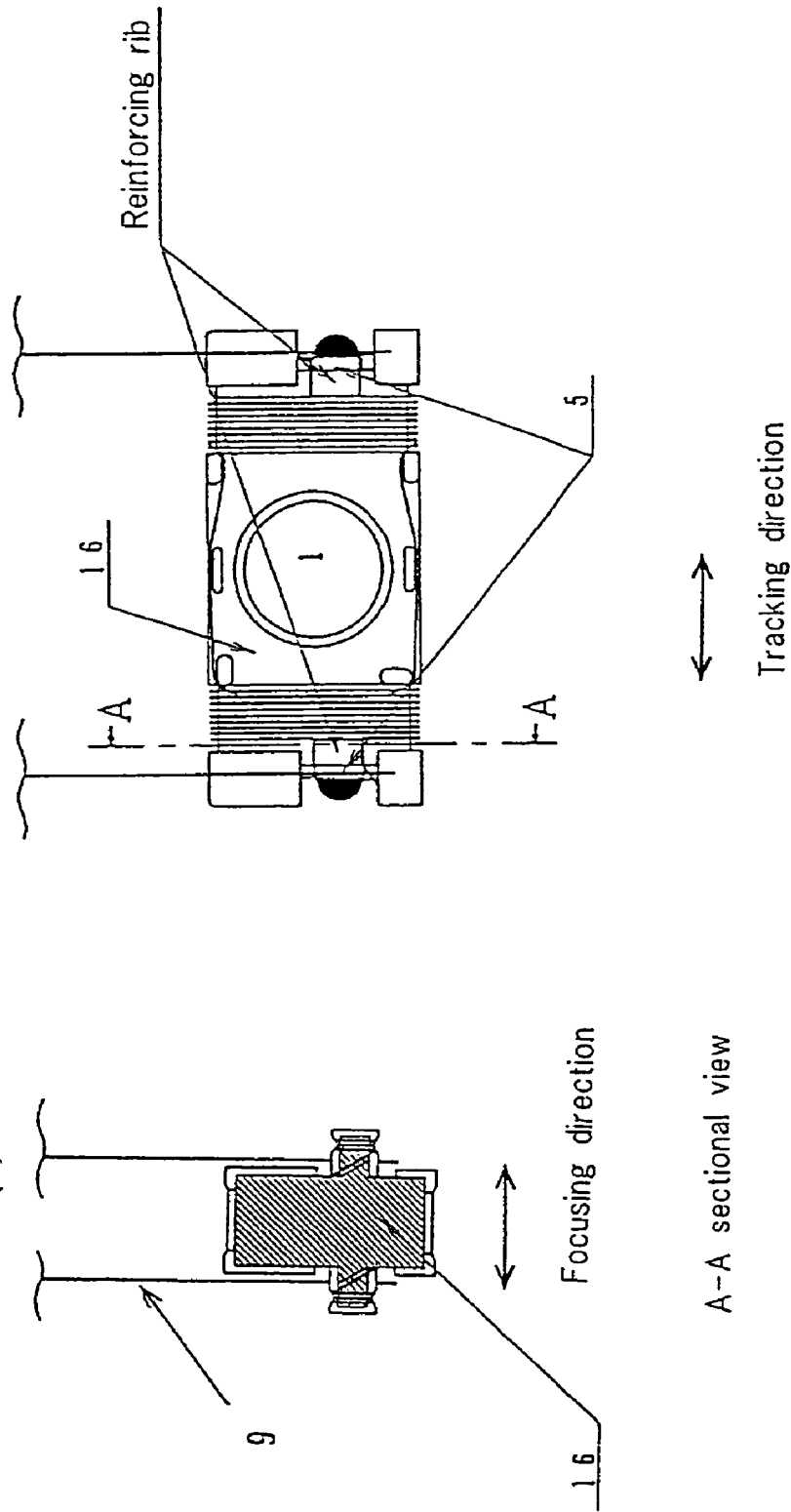
FIG. 6(a) is a front view of a movable section of the objective lens driving apparatus of embodiment 3.
FIG. 6(b) is a sectional view taken along the A—A line of FIG. 6(b).
Figure 7:
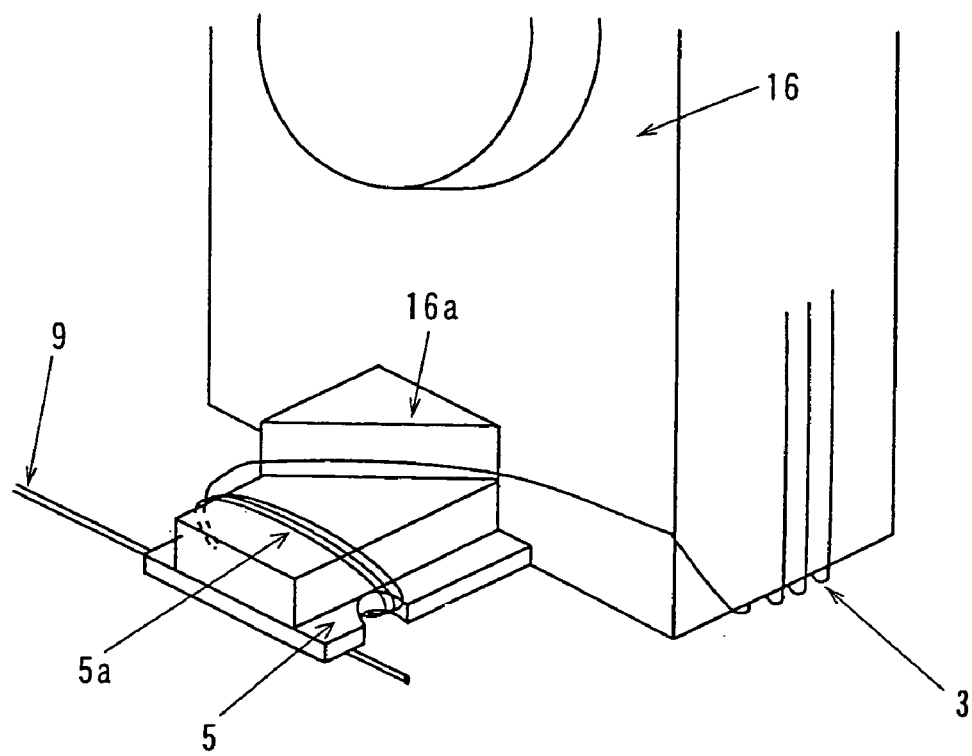
FIG. 7 is a perspective view in schematic form depicting the configuration of the reinforcing rib of the objective lens driving apparatus of embodiment 3.

Referring to FIG. 6 and FIG. 7, an objective lens driving apparatus of embodiment 3 according to the present invention will be explained.

In order to suppress self-resonance of a support printed board, the objective lens driving apparatus of embodiment 3 comprises a lens holder 16 having four reinforcing ribs. The reinforcing rib 16a is different from that of embodiment 1 or embodiment 2 in shape.

The remaining structure of the apparatus is the same as the corresponding structure of the above-mentioned conventional objective lens driving apparatus.

FIG. 6(a) shows a front view, and FIG. 6(b) shows a sectional view taken along the A—A line of FIG. 6(a) of a movable section of the objective lens driving apparatus of embodiment 3. FIG. 7 shows a perspective view in schematic form depicting the configuration of the reinforcing rib 16a of the objective lens driving apparatus of embodiment 3. (The reinforcing rib is represented larger than life.)

The movable section means movable parts held by the suspension wires 9 in the objective lens driving apparatus, including the objective lens 1, the lens holder 16, the focusing coil 3, the tracking coil 4, the support printed boards 5, and the suspension wires 9.

As parts other than the movable parts are the same as the corresponding parts of the above-mentioned conventional objective lens driving apparatus, description is omitted.

In the objective lens driving apparatus of embodiment 3, parts except for the four reinforcing ribs 16a of the lens holder and placement of windings of coils (the focusing coil 3 and the tracking coil 4) are the same as the corresponding parts of the conventional objective lens driving apparatus, these parts are identified by the same reference numbers. Description thereof is omitted.

As shown in FIG. 7, the reinforcing rib 16a of the lens holder 16 contacts the support printed board 5 protruding from the side surfaces of the lens holder (front surface and back surface) (both ends of each of two support printed boards protrude from the side surfaces of the lens holder, respectively (at four locations in total)), thereby reinforcing the base of the support printed board.

At four coil restraining parts, each of the starting ends and the terminating ends of windings of the focusing coil 3 and the tracking coil 4 are fixed, respectively.

In embodiment 3, the contact surfaces of the support printed board and the reinforcing rib may be fixed to each other by adhesive or may not be fixed.

At the coil restraining part, winding of a coil is wound a few turns around the reinforcing rib 16a and the support printed board 5 so as to tie the reinforcing rib 16a and the support printed board 5 in a bundle. In this way, the reinforcing rib 16a and the support printed board 5 are firmly fixed to each other by winding of the coil. With this configuration, resonance of the support printed board can be suppressed by the reinforcing rib.

The reinforcing rib 16a is formed so as to have the same height as the support printed board 5 and the same width as, or narrower width than, the notched portion of the support printed board.

Referring to FIG. 6(b) (a sectional view viewed from right side along the A—A line of the front view of FIG. 6(a)) and FIG. 7, a method of arranging the winding of coils will be explained hereinafter.

At the coil restraining part 5a in the vicinity of the front end of the support printed board, wire of the focusing coil 3 is wound a few turns around the reinforcing rib 16a and the support printed board 5 so as to tie the reinforcing rib 16a and the support printed board 5 in a bundle for restraining. The wire is then drawn along an inclined plane (a plane which is not parallel to a side surface of the lens holder) of upper part of a stepped portion formed on the reinforcing rib 16a (being guided by the inclined plane) and then is led to the focusing coil winding part of the lens holder 16. After that, the winding is wound on it to form the focusing coil 3.

On the completion of the winding work, the winding is located along an inclined plane of upper part of a stepped portion formed on the reinforcing rib 16a (being guided by the inclined plane) and then is led to the coil restraining part 15b in the vicinity of the front end of the support printed board.

At the coil restraining part 5b, winding of the focusing coil 3 is wound a few turns around the reinforcing rib 16a and the support printed board 5 so as to tie the reinforcing rib 16a and the support printed board 5 in a bundle for restraining.

Similarly, wire of the tracking coil 4 is also wound a few turns around the reinforcing rib 16a and the support printed board 5 for restraining by using a grooved portion of the reinforcing rib 16a as a guide, and then is led to the tracking coil winding part of the lens holder for winding.

In the objective lens driving apparatus of embodiment 3, a wiring path of the focusing coil 3 is guided by the inclined plane of the upper part of the stepped portion formed on the reinforcing rib so as to be fixed at the path 3b (as seen in the sectional view taken along the B—B line of FIG. 1).

On the wiring path 3b, the winding does not contact the suspension wire 9. Accordingly, no problem occurs during the assembly process, thereby facilitating assembly of the objective lens driving apparatus and improving the quality of the product in the factory. According to this embodiment, undesired resonance of 6 dB (12 kHz) disappears and high order resonance margin (which is the difference between displacement gain of 1 kHz and peak of high order resonance) is improved from 40 dB to 45 dB.

This promotes tracking performance of the objective lens driving apparatus for the optical data recording medium.

Further, it enables a stable arrangement of the starting ends and the terminating ends of the coils by an automated winder, as well as insertion of the suspension wire.

EMBODIMENT 4

Figure 8:
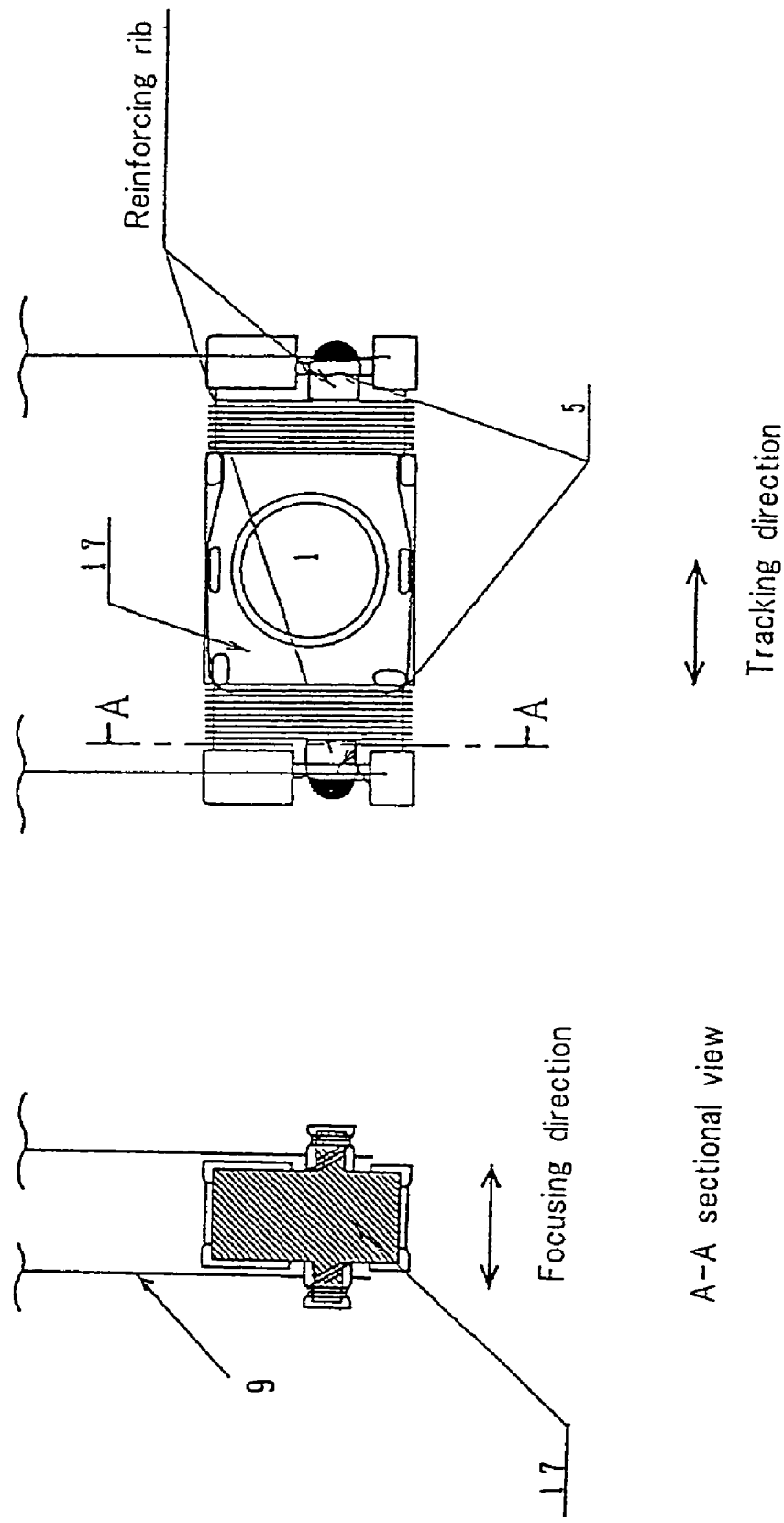
FIG. 8(a) is a front view of a movable section of the objective lens driving apparatus of embodiment 4.
FIG. 8(b) is a front view and a sectional view taken along the A—A line of FIG. 8(a).
Figure 9:
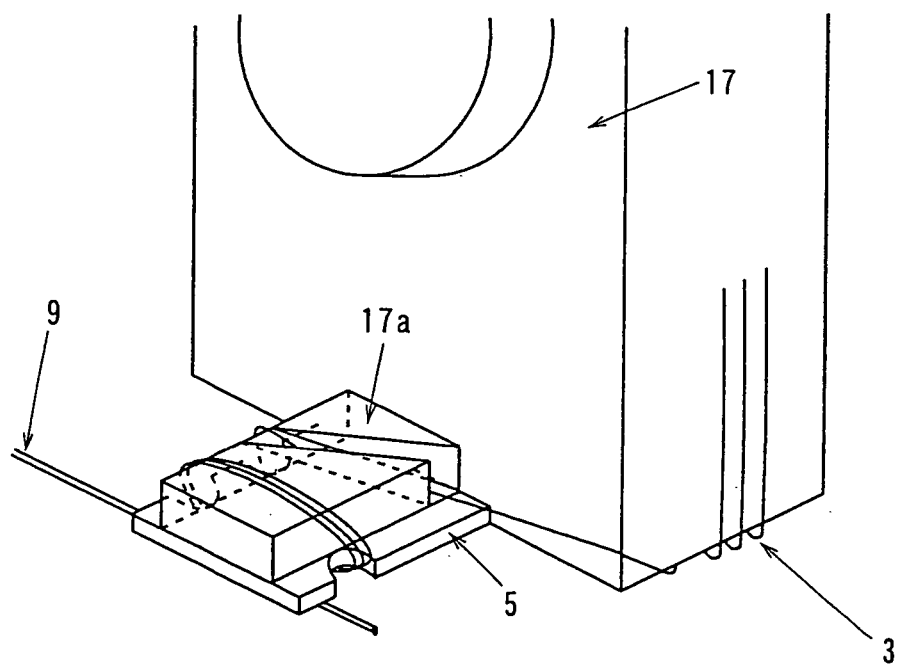
FIG. 9 is a perspective view in schematic form depicting the configuration of the reinforcing rib of the objective lens driving apparatus of embodiment 4.

Referring to FIG. 8 and FIG. 9, an objective lens driving apparatus of embodiment 4 according to the present invention will be explained.

In order to suppress self-resonance of a support printed board, the objective lens driving apparatus of embodiment 4 comprises a lens holder 17 having four reinforcing ribs. The reinforcing rib 17a is different from that of embodiment 1, embodiment 2 or embodiment 3 in shape.

The remaining structure of the apparatus is the same as the corresponding structure of the above-mentioned conventional objective lens driving apparatus.

FIG. 8(a) shows a front view, and FIG. 8(b) shows a sectional view taken along the A—A line of a movable section of the objective lens driving apparatus of embodiment 4. FIG. 9 shows a perspective view in schematic form depicting the configuration of the reinforcing rib 17a of the objective lens driving apparatus of embodiment 4. The reinforcing rib 13a is represented larger than life.

The "movable section" means movable parts held by the suspension wires 9 in the objective lens driving apparatus, including the objective lens 1, the lens holder 17, the focusing coil 3, the tracking coil 4, the support printed boards 5, and the suspension wires 9.

As parts other than the movable parts are the same as the corresponding parts of the above-mentioned conventional objective lens driving apparatus, description is omitted.

In the objective lens driving apparatus of embodiment 4, parts except for the four reinforcing ribs 17a of the lens holder and placement of coils (the focusing coil 3 and the tracking coil 4) are the same as the corresponding parts of the conventional objective lens driving apparatus, these parts are identified by the same reference numbers. Description thereof is omitted.

As shown in FIG. 9, the reinforcing rib 17a of the lens holder 17 contacts the support printed board 5 protruding from the side surfaces of the lens holder (front surface and back surface) (both ends of each of two support printed boards protrude from the side surfaces of the lens holder, respectively (at four locations in total)), thereby reinforcing the base of the support printed board.

At four coil restraining parts, the starting ends and the terminating ends of the focusing coil 3 and the tracking coil 4 are fixed.

In embodiment 4, the contact surfaces of the support printed board and the reinforcing rib may be fixed to each other by adhesive or may not be fixed.

At the coil restraining part, winding of a coil is wound a few turns around the reinforcing rib 17a and the support printed board 5 so as to tie the reinforcing rib and the support printed board 5 in bundle. In this way, the reinforcing rib 17a and the support printed board 5 are firmly fixed to each other by the winding of the coil.

With this configuration, resonance of the support printed board 5 can be suppressed by the reinforcing rib.

The reinforcing rib 17a is formed so as to have the same height as the support printed board 5 and the same width as, or narrower width than, the notched portion of the support printed board.

Referring to FIG. 8(b) (a sectional view viewed from right side along the A—A line of the front view of FIG. 8(a)) and FIG. 9, a method of arranging the windings of coils will be explained hereinafter.

At the coil restraining part 5a in the vicinity of the front end of the support printed board, the focusing coil 3 is wound a few turns around the reinforcing rib 17a and the support printed board 5 so as to tie the reinforcing rib 17a and the support printed board 5 in a bundle for restraining. The wire drawn from the focusing coil is led to the focusing coil winding part of the lens holder 17 through a grooved portion formed on the reinforcing rib 17a. The wire is wound on the focusing winding part to form the focusing coil 3.

On the completion of the winding work, the winding is led to the coil restraining part 5b in the vicinity of the front end of the support printed board through the grooved portion formed on the reinforcing rib 17a (being guided by the grooved portion).

At the coil restraining part 5b, wire of the focusing coil 3 is wound a few turns around the reinforcing rib 17a and the support printed board 5 so as to tie the reinforcing rib 17a and the support printed board 5 in a bundle for restraining.

Similarly, wire of the tracking coil 4 is also wound a few turns around the reinforcing rib 17a and the support printed board 5 for restraining, being guided by the grooved portion of the reinforcing rib 17a as a guide, and then is wound on the tracking coil winding part of the lens holder 17 with reinforcing ribs.

In the objective lens driving apparatus of embodiment 4, a wiring path of the focusing coil 3 is guided by the groove of the reinforcing rib so as to be fixed at the path 3b (as shown in FIG. 1(c) which is a sectional view taken along the B—B line of FIG. 1(a)).

On the wiring path 3b, the winding does not contact the suspension wire 9. Accordingly, no problem occurs during assembly process, thereby facilitating assembly of the objective lens driving apparatus and improving the quality of the product in the factory.

According to this embodiment, undesired resonance of 6 dB (12 kHz) disappears and high order resonance margin (which is the difference between displacement gain of 1 kHz and peak of high order resonance) is improved from 40 dB to 45 dB.

This promotes tracking performance of the objective lens driving apparatus for the optical data recording medium.

Further, it enables a stable arrangement of the starting ends and the terminating ends of the coils by an automated winder (arrangement for restraining the starting ends and the terminating ends of windings of the coils at the support printed board), as well as insertion of the suspension wire.

EMBODIMENT 5

Figure 10:
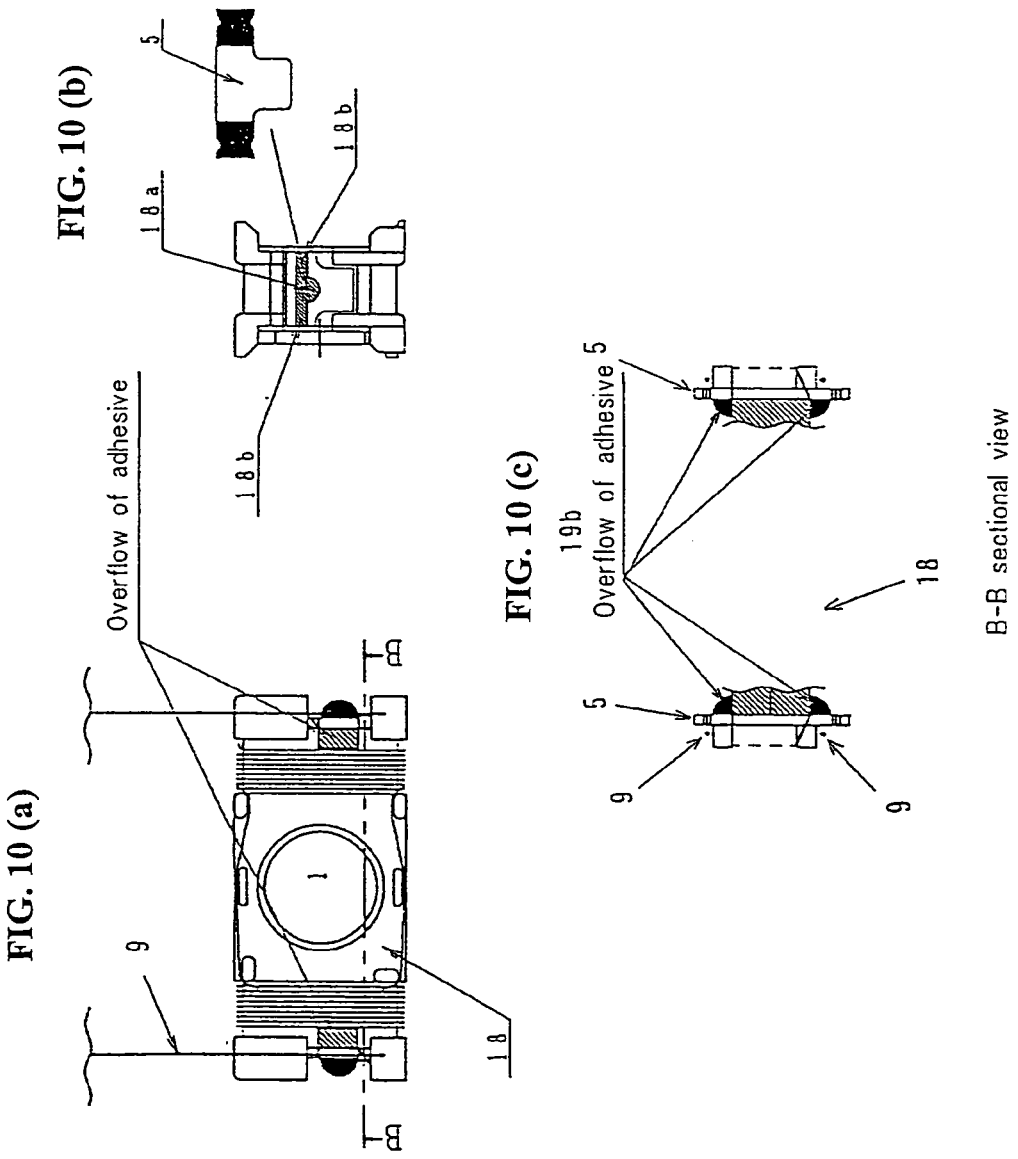
FIG. 10 is a front view of a movable section of the objective lens driving apparatus of embodiment 5. FIG.
Figure 11:
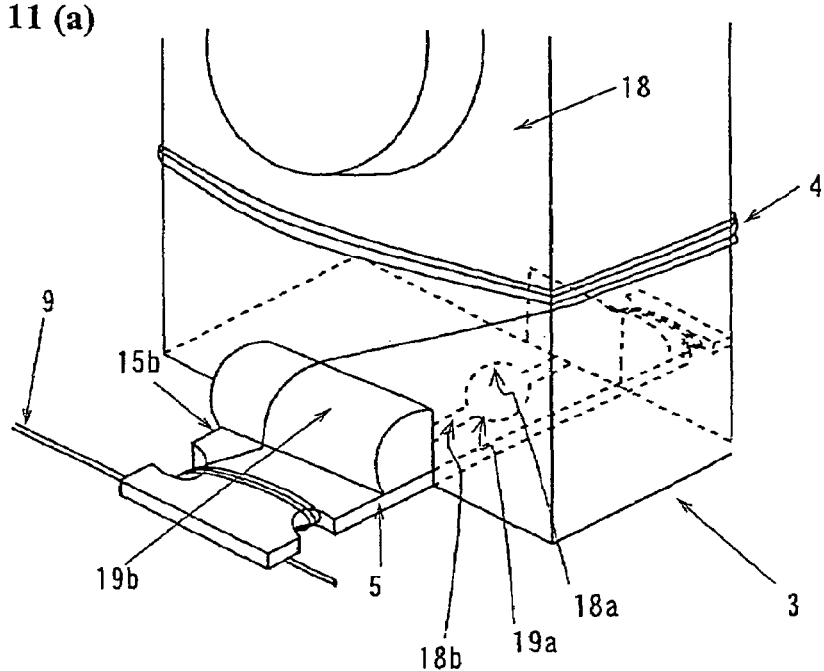
FIG. 11(a) is a perspective view in schematic form depicting the configuration of the reinforcing rib of the objective lens driving apparatus of embodiment 5.
FIG. 11(b) and FIG. 11(c) depict a manufacturing method for manufacturing the objective lens driving apparatus of embodiment 5.
Figure 11:
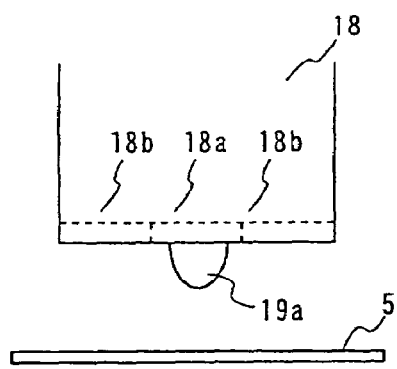
Figure 11:
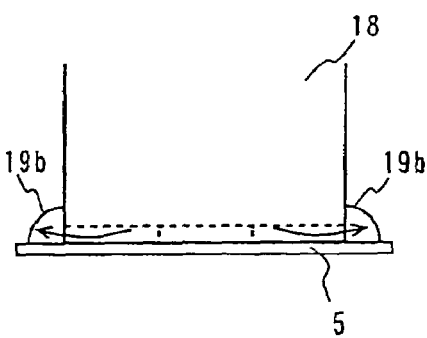

Referring to FIG. 10 and FIG. 11, an objective lens driving apparatus of embodiment 5 according to the present invention will be explained.

In the objective lens driving apparatus of embodiment 5, an adhesive is applied to the corner part formed by the part of the support printed board 5 which protrudes from the lens holder and the side of the lens holder 18 in order to suppress self-resonance of the support printed board. Further, the lens holder 18 has a pasted part with the support printed board 5.

The pasted part has a first depression which acts as an adhesive reservoir and a groove which extends from the first depression to a base of the support printed board.

The remaining structure of the apparatus is the same as the corresponding structure of the above-mentioned conventional objective lens driving apparatus.

FIG. 10(a) shows a front view, and FIG. 10(b) shows a right side view (showing the appearance of the apparatus from which the support printed board 5 is removed), and FIG. 10(c) shows a sectional view taken along the B—B line of a movable section of the objective lens driving apparatus of embodiment 5. FIG. 11(a) shows a perspective view in schematic form depicting the configuration of the reinforcing rib of the objective lens driving apparatus of embodiment 5. The reinforcing rib is represented larger than life. FIG. 11(b) and FIG. 11(c) show the manufacturing method of the objective lens driving apparatus according to this invention.

The "movable section" means movable parts held by the suspension wires 9 in the objective lens driving apparatus, including the objective lens 1, the lens holder 18, the focusing coil 3, the tracking coil 4, the support printed boards 5, and the suspension wires 9. As parts other than the movable parts are the same as the corresponding parts of the above-mentioned conventional objective lens driving apparatus, description is omitted.

As shown in the right side view of FIG. 10 and FIG. 11, the lens holder 18 includes a first depression 18a and a groove 18b on the bottom (the area to which adhesive is applied for bonding of the support printed board 5 with the lens holder 18). Both of the bonded parts (two locations) of the two support printed boards are the same in configuration.

In FIG. 11(b), the adhesive 19a is mounted on the first depression 18a enough to bulge and immediately afterward, the support printed board 5 is pushed onto it in the direction shown by an arrow 20.

By pushing on the support printed board 5, the adhesive 19a extends along the groove. As a result, as shown in FIG. 11(c), the support printed board 5 is stuck and fixed to the bottom surface of the lens holder.

Further, the adhesive extending along the groove overflows into the corner part defined by the part of the support printed board 5 which protrudes from the lens holder and the side surfaces (the front surface and back surface) of the lens holder 18 (the end part of the groove leads up to the corner part).

The overflowed adhesive 19b becomes hardened at the corner part, thereby reinforcing the base of the support printed board and suppressing self-resonance of the support printed board 5.

According to this embodiment, undesired resonance of 6 dB (12 kHz) disappears and high order resonance margin (which is the difference between displacement gain of 1 kHz and peak of high order resonance) is improved from 40 dB to 45 dB.

This promotes tracking performance of the objective lens driving apparatus for the optical data recording medium.

Further, the manufacturing method enables reinforcement of the base of the support printed board without adding any new process.

EMBODIMENT 6

Figure 12:
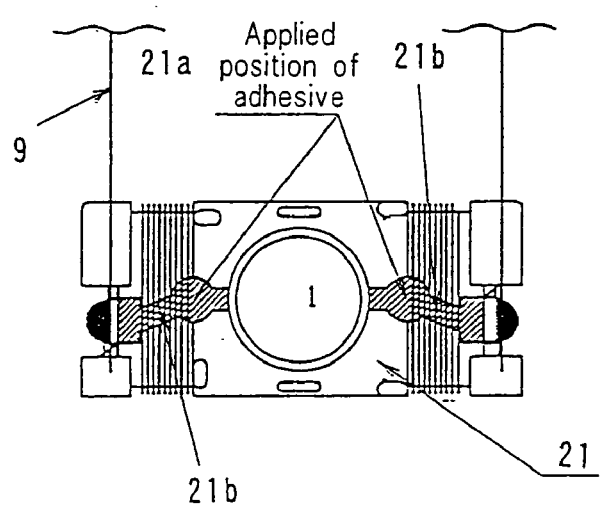
FIG. 12 is a front view of a movable section of the objective lens driving apparatus of embodiment 6.
Figure 13:
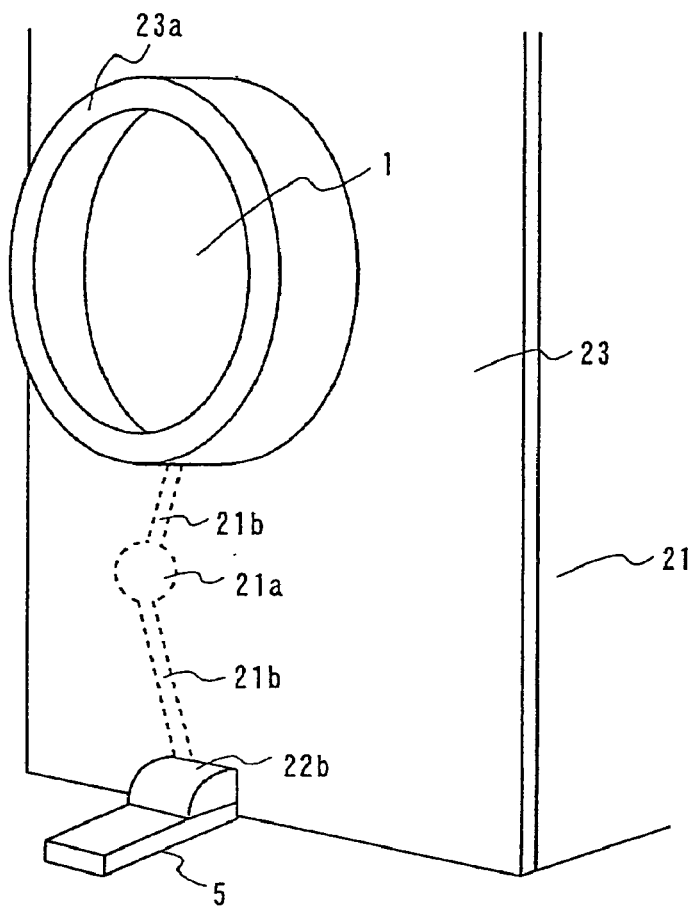
Figure 13:
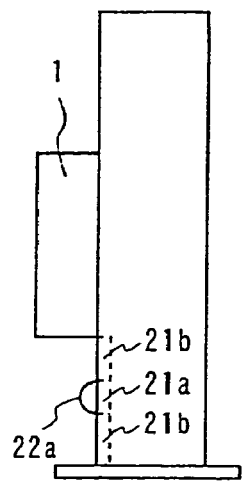
Figure 13:
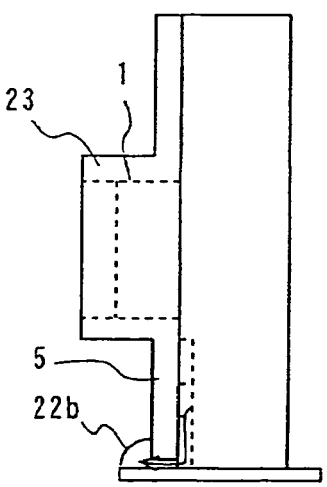
Figure 14:
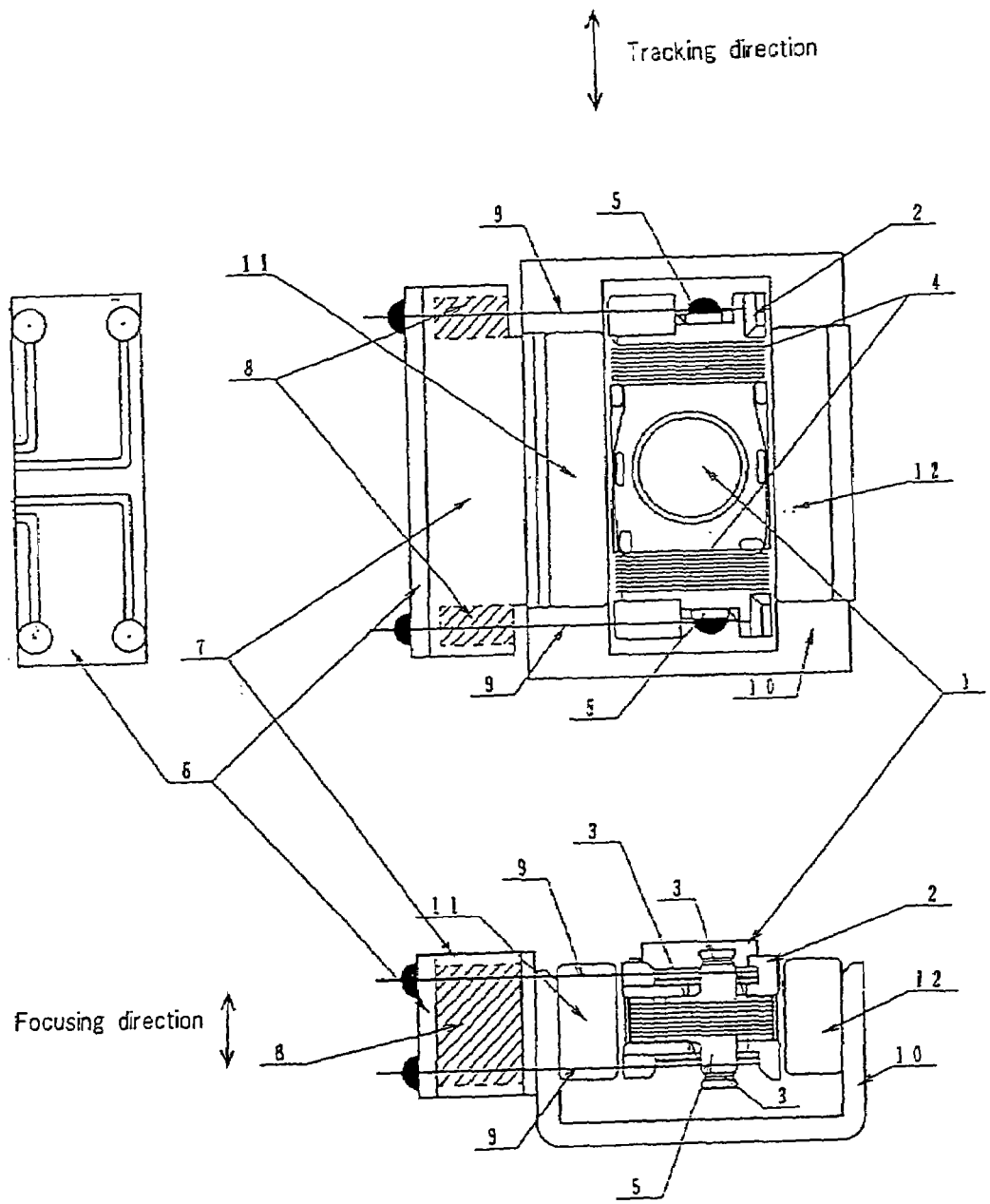
FIG. 14 is a view depicting the configuration of the conventional objective lens driving apparatus.

Referring to FIG. 12 and FIG. 13, an objective lens driving apparatus of embodiment 6 according to the present invention will be explained.

In the objective lens driving apparatus of embodiment 6, an adhesive is applied to the corner part formed by the part of the support printed board 5 which protrudes from the lens holder and the side surface (front surface) of a lens holder 21 in order to suppress self-resonance of the support printed board.

A lens 1 is fitted to the lens holder 21. On the front surface, a second depression 21a and a groove 21b which extends from the second depression 21a to the lens 1 and the corner part, respectively, are formed. (FIG. 12).

The remaining structure of the apparatus is the same as the corresponding structure of the above-mentioned conventional objective lens driving apparatus.

FIG. 12 shows a front view of a movable section of the objective lens driving apparatus of embodiment 6. FIG. 13(a) shows a perspective view in schematic form depicting the configuration of the reinforcing rib of the objective lens driving apparatus of embodiment 6. The reinforcing rib is represented larger than life. FIGS. 13(b) and (c) show the manufacturing method of the objective lens driving apparatus according to the present invention.

The movable section means movable parts held by the suspension wires 9 in the objective lens driving apparatus, including the objective lens 1, the lens holder 21, the focusing coil 3, the tracking coil 4, the support printed boards 5, the suspension wires 9, and a lens protector 23. The lens protector 23 is shown in FIG. 13.

As parts other than the movable parts are the same as the corresponding parts of the above-mentioned conventional objective lens driving apparatus, description is omitted.

In FIG. 13(b), adhesive 22a is mounted on the second depression 21a enough to bulge and immediately afterward, the lens protector 23 is pushed onto it in the direction shown by an arrow 24.

By pushing on the lens protector 23, the adhesive 22a extends along the groove.

As a result, as shown in FIG. 13(c), the lens protector 23 is stuck and fixed to the front surface of the lens holder.

The adhesive which extends along the groove 21b reaches the circumference of the objective lens 1 so as to fix the objective lens to the lens holder.

Further, the adhesive which extends along the groove 21b overflows into the corner part formed by the part of the support printed board 5 which protrudes from the lens holder and the side surfaces of the lens holder 21. The end part of the groove leads up to the corner part.

The overflowed adhesive 22b becomes hardened at the corner part, thereby reinforcing the base of the support printed board and suppressing self-resonance of the support printed board 5.

Moreover, in embodiment 6, only the base of the support printed board protruding from the front surface of the lens holder is reinforced. Therefore, with respect to the reinforcement of the base, of the support printed board protruding from the back surface of the lens holder, it is desirable to adopt the method in embodiment 5.

According to this embodiment, undesired resonance of 6 dB (12 kHz) disappears and high order resonance margin (difference between displacement gain of 1 kHz and peak of high order resonance) is improved from 40 dB to 45 dB.

This promotes tracking performance of the objective lens driving apparatus for the optical data recording medium.

The lens protector 23 is made of soft molding material such as DURACON™ and tubular part thereof protrudes further forward than the front surface of the lens.

In the case where an optical pickup operates irregularly, the soft lens protector 23 hits against the recording medium, but the objective lens 1 which is located at the position recessed from the front surface of the lens protector does not hit the recording medium.

The lens protector 23 protects the recording medium and the objective lens 1 from possible breakage in the above-mentioned way. Therefore, the lens protector 23 is useful in itself and it is not a new added component for the purpose of reinforcing the support printed board 5 in the present invention.

The object lens driving apparatus of embodiment has the effect of achieving the object of providing a lens driving apparatus with high tracking performance without adding any new component.

Further, by the above-mentioned manufacturing method, the base of the support printed board 5 protruding forward can be reinforced without adding any new process.

According to this invention, the coil restraining part of the support printed board does not cause undesired resonance and unnecessary disturbance in phase, and it is therefore possible to obtain the advantageous effect of achieving the inexpensive and easily manufacturable objective lens driving apparatus with high tracking performance.

Furthermore, according to this invention, it is possible to obtain the advantageous effect of achieving the objective lens driving apparatus in which the starting end and the terminating end of the coil wound by an automated winder are easily restrained.

According to this invention, it is possible to obtain the advantageous effect of achieving the inexpensive manufacturing method of the objective lens driving apparatus with high tracking performance without adding any new manufacturing process.

While preferred embodiments have been described of the invention with a certain degree of particularity, it is understood that the present disclosure of the preferred embodiments may be changed in the details of construction and the varied combination and arrangement of parts without departing from the scope and the spirit of the claimed invention.

INDUSTRIAL APPLICABILITY

The objective lens driving apparatus and manufacturing method thereof of the present invention are applicable for performing focusing and tracking with respect to optical data recording media (for example, DVD discs).

What is claimed is:

1. An objective lens driving apparatus comprising:
   an objective lens;
   a lens holder for holding said objective lens;
   a focusing coil having a central axis substantially parallel to a focusing direction of said objective lens;
   a tracking coil having a central axis substantially parallel to a tracking direction of said objective lens;
   a magnet for generating a magnetic field in the vicinity of said focusing coil and said tracking coil;
   a support printed board which is attached to said lens holder and which protrudes from a front face of said lens holder and a rear face of said lens holder such that the protruding portions act as a restraining part for restraining a winding of at least one of said focusing coil and said tracking coil;
   a plurality of suspension wires which are made of conductive material, and connected to said winding of at least one of said focusing coil and said tracking coil at said restraining part; and
   a reinforcing rib which contacts both said lens holder and said support printed board at a portion of said support printed board protruding from said lens holder, so as to reinforce said support printed board, wherein said reinforcing rib has a guide face for positioning the winding of said focusing coil and said tracking coil, and,
   wherein winding of at least one of said focusing coil and said tracking coil is restrained by winding at least one turn around said support printed board and said reinforcing rib.

2. The objective lens driving apparatus described in claim 1 wherein said reinforcing rib has a stepped portion, and the winding of at least one of said focusing coil and said tracking coil is located along said stepped portion.

3. The objective lens driving apparatus described in claim 1 wherein said reinforcing rib part has a grooved portion, and winding of at least one of said focusing coil and said tracking coil is located along said grooved portion.

4. An objective lens driving apparatus comprising:
   an objective lens;
   a lens holder for holding said objective lens;
   a focusing coil having a central axis substantially parallel to a focusing direction of said objective lens;
   a tracking coil having a central axis substantially parallel to a tracking direction of said objective lens;
   a magnet for generating a magnetic field in the vicinity of said focusing coil and said tracking coil;
   a support printed board which is attached to said lens holder and which protrudes from a front face of said lens holder and a rear face of said lens holder such that the protruding portions act as a restraining part for restraining a winding of at least one of said focusing coil and said tracking coil;
   a plurality of suspension wires which are made of conductive material, and connected to said winding of at least one of said focusing coil and said tracking coil at said restraining part; and,
   adhesive applied to a corner part defined by a protrusion of said support printed board from said lens holder and a side of said lens holder, wherein said lens holder has a pasted part comprising a depression for receiving said adhesive and a groove extending from said depression to said corner part of said support printed board.

5. An objective lens driving apparatus comprising:
   an objective lens;

a lens holder for holding said objective lens;

a focusing coil having a central axis substantially parallel to a focusing direction of said objective lens;

a tracking coil having a central axis substantially parallel to a tracking direction of said objective lens;

a magnet for generating a magnetic field in the vicinity of said focusing coil and said tracking coil;

a support printed board which is attached to said lens holder and which protrudes from a front face of said lens holder and a rear face of said lens holder such that the protruding portions act as a restraining part for restraining a winding of at least one of said focusing coil and said tracking coil;

a plurality of suspension wires which are made of conductive material, and connected to said restraining winding of at least one of said focusing coil and said tracking coil at said restraining part; and, adhesive applied to a corner part defined by a portion of said support printed board that protrudes from said lens holder and a side of said lens holder;

wherein said lens holder has a pasted part comprising a depression for receiving said adhesive and a groove extending from said depression to said corner part of said support printed board; and, wherein said pasted part further comprises a second depression and a groove extending from said second depression to said objective lens and a groove extending from said second depression to a base of said support printed board.

6. A method of manufacturing an objective lens driving apparatus of claim 5 comprising:

dropping adhesive into said first depression formed on said lens holder; and, pushing said support printed board against said first depression wherein adhesive in said first depression flows along said first groove to said corner part.

7. A method of manufacturing an objective lens driving apparatus of claim 5 comprising:

dropping adhesive into said second depression formed on said lens holder; and, pushing said support printed board against said second depression wherein adhesive in said second depression flows along a groove to said corner part.

* * * * *

UNITED STATES PATENT AND TRADEMARK OFFICE
CERTIFICATE OF CORRECTION

PATENT NO.       : 7,082,002 B2
APPLICATION NO.  : 11/013674
DATED            : July 25, 2006
INVENTOR(S)      : Yasuo Fujikawa It is certified that error appears in the above-identified patent and that said Letters Patent is hereby corrected as shown below:

Claim 5, on page 19, beginning on line 14 should be replaced with the following:

a plurality of suspension wires which are made of conductive material, and connected to said restraining part for restraining a winding of at least one of said focusing coil and said tracking coil at said restraining part; and Signed and Sealed this Thirteenth Day of February, 2007

JON W. DUDAS
*Director of the United States Patent and Trademark Office*

UNITED STATES PATENT AND TRADEMARK OFFICE
CERTIFICATE OF CORRECTION

PATENT NO. : 7,082,002 B2
APPLICATION NO. : 11/013674
DATED : July 25, 2006
INVENTOR(S) : Yasuo Fujikawa Page 1 of 1

It is certified that error appears in the above-identified patent and that said Letters Patent is hereby corrected as shown below:

Insert
The following bibliographic information be on the Title page of the patent in items (62) and (30):

(62)    Related U.S. Application Data

Divisional of U.S. Application No. 10/049,179, filed on Feb. 8, 2002 (now Pat. No. 6,857,126, issue Feb. 15, 2005), which was a U.S. national phase application of PCT/JP2001/06312, filed on July 19, 2001.

(30) Foreign Application Priority Data

Jul. 24, 2000 (JP).....................................2000-222321

Signed and Sealed this

Tenth Day of April, 2007

JON W. DUDAS
*Director of the United States Patent and Trademark Office*